(12) United States Patent
George et al.

(10) Patent No.: US 9,006,120 B2
(45) Date of Patent: Apr. 14, 2015

(54) ULTRA-BROAD BANDWIDTH LASER GLASSES FOR SHORT-PULSE AND HIGH PEAK POWER LASERS

(71) Applicant: Schott Corporation, Elmsford, NY (US)

(72) Inventors: Simi George, Pittston, PA (US); Nathan Carlie, Waverly, PA (US); Sally Pucilowski, Duryea, PA (US); Joseph Hayden, Clarks Summit, PA (US)

(73) Assignee: Schott Corporation, Elmsford, NY (US)

( * ) Notice: Subject to any disclaimer, the term of this patent is extended or adjusted under 35 U.S.C. 154(b) by 0 days.

(21) Appl. No.: 14/088,973

(22) Filed: Nov. 25, 2013

(65) Prior Publication Data

US 2014/0146841 A1     May 29, 2014

Related U.S. Application Data

(60) Provisional application No. 61/730,569, filed on Nov. 28, 2012.

(51) Int. Cl.

| | |
|---|---|
| *C03C 3/19* | (2006.01) |
| *C03C 3/17* | (2006.01) |
| *H01S 3/17* | (2006.01) |
| *B23K 26/06* | (2014.01) |
| *C03C 3/068* | (2006.01) |
| *H01S 3/16* | (2006.01) |

(52) U.S. Cl.
CPC .............. *H01S 3/175* (2013.01); *B23K 26/06* (2013.01); *C03C 3/068* (2013.01); *H01S 3/1611* (2013.01); *H01S 3/1618* (2013.01)

(58) Field of Classification Search
CPC .............. C03C 3/14; C03C 3/17; C03C 3/19; C03C 3/068; C03C 4/007; C03C 4/12; C09K 11/7774; C09K 11/7777; C09K 11/7706; C09K 11/7709; H01S 3/175; H01S 3/176; H01S 3/1608; H01S 3/1618; H01S 3/1611
USPC .................. 501/45, 47, 48, 78; 372/4, 39, 40; 252/301.4 P, 301.6 P
See application file for complete search history.

(56) References Cited

U.S. PATENT DOCUMENTS

| | | | |
|---|---|---|---|
| 3,731,226 | A | 5/1973 | Snitzer et al. |
| 3,846,142 | A | 11/1974 | Buzhinsky et al. |
| 4,806,138 | A | 2/1989 | Miura et al. |
| 4,962,067 | A | 10/1990 | Myers |
| 5,526,369 | A | 6/1996 | Hayden et al. |
| 5,663,972 | A | 9/1997 | Payne et al. |
| 6,194,334 | B1 | 2/2001 | Aitken et al. |
| 6,352,950 | B1 | 3/2002 | Aitken et al. |
| 6,656,859 | B2 | 12/2003 | Aitken et al. |
| 6,859,606 | B2 | 2/2005 | Jiang et al. |
| 7,531,473 | B2 | 5/2009 | Myers |
| 2002/0082156 | A1 | 6/2002 | Aitken et al. |
| 2004/0101269 | A1 | 5/2004 | Jiang et al. |
| 2006/0039426 | A1 | 2/2006 | Myers |

FOREIGN PATENT DOCUMENTS

JP           60-191029 A      9/1985

OTHER PUBLICATIONS

Sontakke et al., "Efficient Non-Resonant Energy Transfer in Nd3+—Yb3+ Codoped Ba—Al metaphosphate Glasses," J. Opt. Soc. Am. B/vol. 27, No. 12, [2010], pp. 2750-2758.
Rivera-Lòpez et al., "Efficient Nd3+→Yb3+ Energy Transfer Processes in High Photon Energy Phosphate Glasses for 1.0 μm Yb3+ Laser," J. Appl. Phys. 109, 123514 [2011].
E. Yahel et al., "Modeling and Optimization of High-Power Nd3+—Yb3+ Codoped Fiber Lasers," J. Lightwave Technology, vol. 24, No. 3, pp. 1601-1609 [Mar. 2006].
G.R. Hays, et al., "Broad-spectrum neodymium-doped laser glasses for high-energy chirped-pulse amplification," Appl. Opt., vol. 46, No. 21,[2007] pp. 4813-4819.
J.H. Yang, et al., "Mixed Former Effects: A Kind of Compositions Adjusting Method of Er-doped glass for broadband amplification," Chin. Phys. Lett., vol. 19, No. 10, [2002], pp. 1516-1518.
J. S. Hayden et al., "Effect of composition on the thermal, mechanical and optical properties of phosphate laser glasses," SPIE, vol. 1277, High-Power Solid State Lasers and Applications [1990], pp. 121-139.
De Sousa et. al., "Spectroscopy of Nd3+ and Yb3+ codoped Fluoroindogallate glasses" J. Appl. Phys., vol. 90, No. 7, [2001], pp. 3308-3313.
Laser Focus World, Apr. 2008, pp. 19-20.
Michael D. Perry et al. "Terrawatt to pettawatt subpicosecond lasers" Science, vol. 264, [1994] pp. 917-924.
Walter Koechner "Solid State Laser Engineering", 6ed, Springer Science, [2006] (pp. 534-542; pp. 731-732).

(Continued)

*Primary Examiner* — Anthony J Green
*Assistant Examiner* — Elizabeth A Bolden
(74) *Attorney, Agent, or Firm* — Millen, White, Zelano, Branigan, P.C.

(57) ABSTRACT

The invention relates to glasses for use in solid laser applications, particularly short-pulsed, high peak power laser applications. In particular, the invention relates to a method for broadening the emission bandwidth of rare earth ions used as lasing ions in solid laser glass mediums, especially phosphate-based glass compositions, using Nd and Yb as co-dopants. The invention further relates to a laser system using a Nd-doped and Yb-doped phosphate laser glass, and a method of generating a laser beam pulse using such a laser system.

24 Claims, 2 Drawing Sheets

(56) References Cited

OTHER PUBLICATIONS

Erhard W. Gaul et al. "Demonstration of a 1.1 petawatt laser based on a hybrid optical parametric chirped pulse amplification/mixed Nd:glass amplifier" Applied Optics, vol. 49, No. 9, [2010], pp. 1676-1681.

Emmanuel Desurvire, "Erbium-Doped Fiber Amplifiers", John Wiley and Sons, (1994), (pp. 215-225; pp. 244-255; pp. 678-692).

W. J. Miniscalco et al. "General Procedure for the analysis of Er3+ Cross Sections" Optical Society of America, [1991], 3 pages.

L.R.P. Kassab et al. "GeO2—PbO—Bi2O3 glasses doped with Yb3+ for laser applications", Journal of Non-Crystalline Solids, vol. 348 (2004) pp. 103-107.

Catalin V. Filip "Atomic Phase Shifts in Mixed-Glass, Multipetawatt Laser Systems" Optics Express, vol. 19, No. 21, [Oct. 2011], pp. 20953-20959.

E. Desurvire et al. "Evaluation of 4I15/2 and 4I13/2 Stark-level energies in erbium doped aluminosilicate glass fibers" Optics Letters, [1990], vol. 15, No. 10, pp. 547-549.

European Search Report related to corresponding European Patent Application No. 13194834 dated Mar. 14, 2014.

FIG. 1 Comparison of experimental emission spectra obtained at different pump energy settings for the Ce-Yb-Nd co-doped glass system.
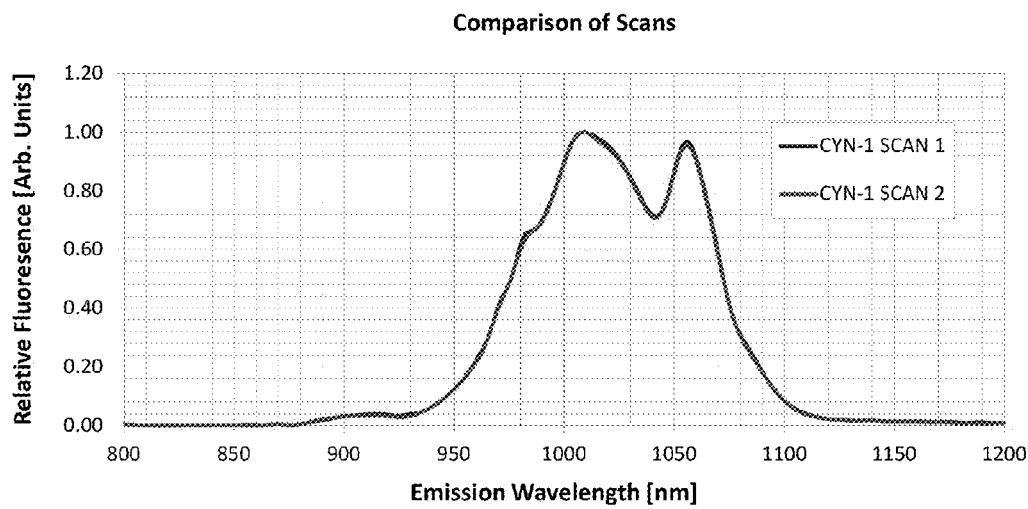
FIG. 2 LaYbNd-doped glass emission data collected at different pump energies.
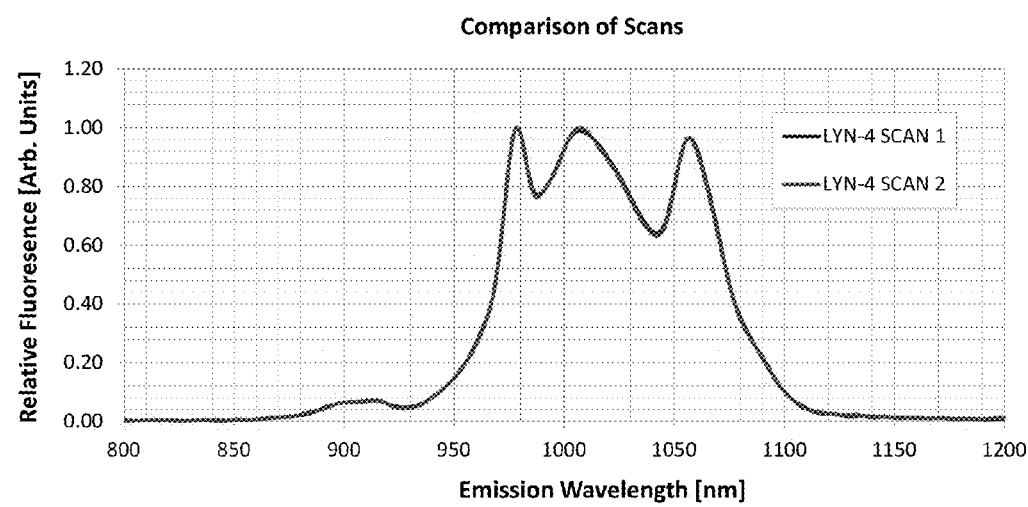

FIG. 3 Emission band-width changes as a function of dopant concentrations.
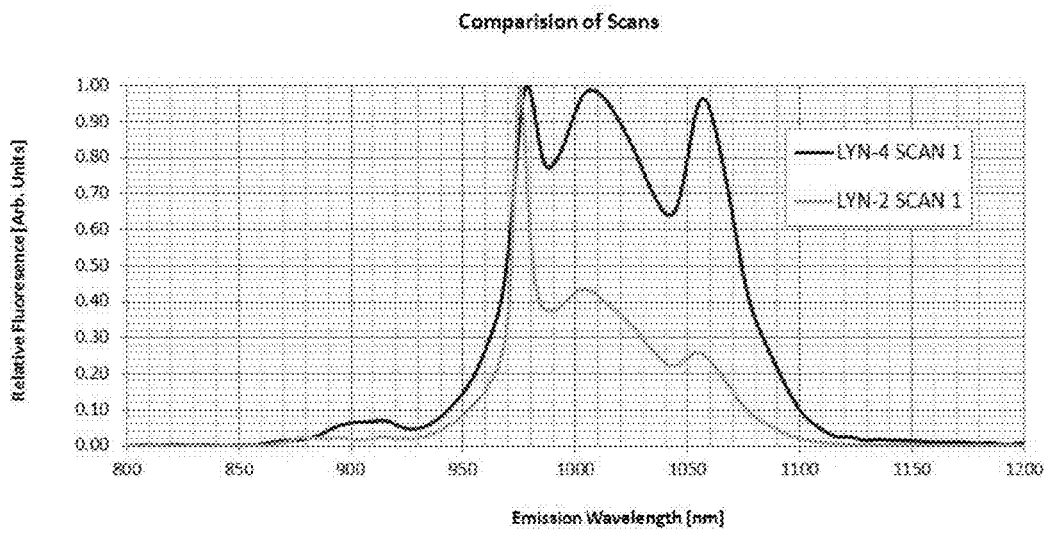
FIG. 4 Comparison of emission curves of the new ultra-broad bandwidth laser glasses containing rare earth mixture with the prior art phosphate glass, LG770.
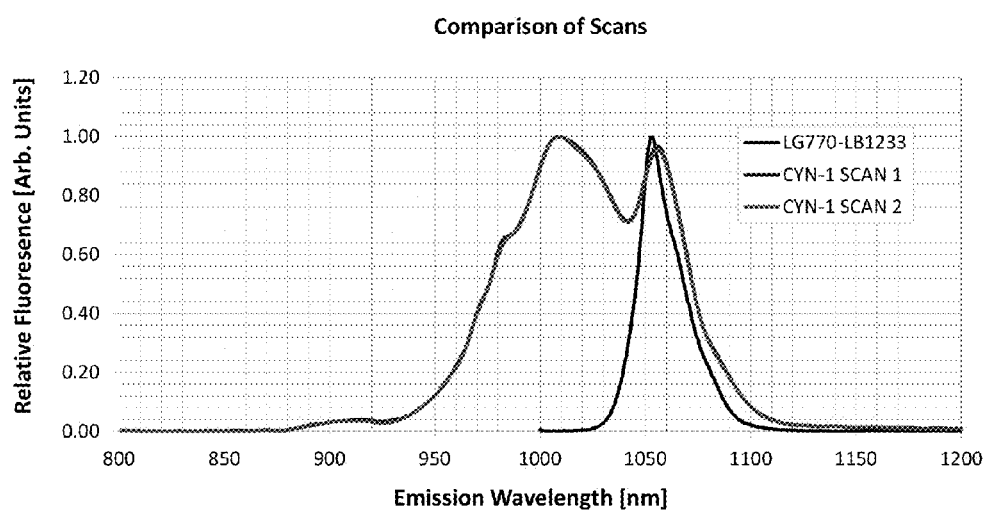

ULTRA-BROAD BANDWIDTH LASER GLASSES FOR SHORT-PULSE AND HIGH PEAK POWER LASERS

SUMMARY OF THE INVENTION

The invention relates to glasses for use in solid laser applications, particularly short-pulsed, high peak power laser applications. In particular, the invention relates to a method for broadening the emission bandwidth of rare earth ions used as lasing ions in solid laser glass mediums, especially phosphate-based glass compositions.

In high power and short-pulse laser applications, such as the present petawatt laser systems and ultra-short pulsed lasers (lasers producing light pulses with a duration of, for example, around a femtosecond) as well as the future exawatt lasers systems, it is desirable that the solid-sate laser medium have a broad emission bandwidth. See, for example, the Hercules laser described in Laser Focus World, April 2008, pp. 19-20, which uses Ti doped sapphire crystals.

Titanium-sapphire [Ti:Sapphire, Ti:$Al_2O_3$] crystals have a broad emission bandwidth as well as high laser cross sections over a broad region of emission. These properties, in combination with the excellent thermal, physical and optical properties of the sapphire crystal, make this the gain material of choice for active solid-state ultra-short pulsed lasers. However, the short fluorescence lifetime necessitates the need for pumping Ti:Sapphire with other lasers (Ti doped sapphire short pulse lasers are pumped by glass lasers which in turn are pumped by flashlamps). This adds to the overall architecture of lasers for scaling up to exawatt peak powers. Moreover, being a crystalline material, generating large apertures of this material with the optical qualities required has been challenging and expensive.

Rare earth doped glasses can also be used in laser architectures designed to produce short-pulses. There are several advantages to using doped glasses over crystals. These include lower costs, and higher available energies since glasses can be manufactured in large sizes with high optical quality, while Ti doped sapphire is limited in size. Much simpler laser designs are possible with the glass approach, since laser glasses can be directly pumped by flashlamps. So, unlike lasers using Ti:Sapphire crystals, the glass approach does not require one to first build pump lasers.

Laser glasses are produced by doping host glass systems with rare earth elements that have the ability to laser, such as neodymium and ytterbium. The lasing ability of these rare earth doped laser glasses results from the light amplification achieved by stimulated emission of the excited rare earth element ions within the glass.

Glasses have a proven track record as a host matrix suitable for rare-earth ions that provide the large apertures necessary for high average power laser systems. This is especially true for phosphate glasses which can be manufactured in large quantities and can be platinum particle free when manufactured under the right processing conditions.

Phosphate laser glasses are well known for use as a host matrix for high average power and high peak energy laser systems. See, for example, U.S. Pat. No. 5,526,369 (Hayden et al.) which discloses Nd-doped phosphate laser glasses. But, in this case, the laser glass is designed to have a narrow emission bandwidth (less than 26 nm) to improve extraction efficiency. In this typical type of laser, the emission of the laser is narrow compared to the emission bandwidth, and thus, the emitted light at wavelengths outside of the laser bandwidth at which the laser operates is effectively wasted. For this reason, narrow emission bandwidths were desirable.

Other prior work using phosphate laser glasses have focused on modifying the glass host structure in order to broaden the bandwidth as well as to improve cross sections and thermal performance. See, for example, Payne et al. (U.S. Pat. No. 5,663,972) which discloses the use of Nd-doped phosphor-alumino laser glasses containing MgO. These glasses are described as having broad emission bandwidths. However, the Nd-doped phosphate glass described therein is difficult to manufacture with high yields. Moreover, there is still a need for a material having even larger emission bandwidth.

J. S. Hayden et. al., "Effect of composition on the thermal, mechanical and optical properties of phosphate laser glasses," SPIE Vol. 1277 (1990), 127-139, describes a study of 41 Nd-doped phosphate laser glasses with respect to certain modifier components. In these glasses the amount of alkali and alkaline earth metal contents were varied to investigate their impact on the thermal, mechanical, optical, and laser properties of the glasses. In that study, it was determined that the emission cross section remained nearly constant over a wide range of modifier compositions.

Other attempts to obtain glasses with broad emission bandwidths have used a tellurite host material. See, for example, Aitken et al. (U.S. Pat. No. 6,656,859) which describes a tellurite glass doped with erbium which contain 65-97% $TeO_2$. See also Aitken et al. (U.S. Pat. No. 6,194,334) which describes an alkali-tungsten-tellurite glass containing 10-90% $TeO_2$, and Jiang et al. (U.S. Pat. No. 6,859,606) which describes a boro-tellurite glass containing 50-70% $TeO_2$.

J. H. Yang, et al., "Mixed Former Effects: A Kind of Compositions Adjusting Method of Er-doped glass for broadband amplification," Chin. Phys. Lett. 19[10] (2002) 1516-1518, disclose the results of an Er-doped bismuth-based glass. The glass was found to have a high emission cross section ($\sigma^p_e$=0.66-0.90 $pm^2$) and large fluorescence FWHM (fluorescence full width at half maximum) (68-95 nm) in comparison to other erbium-doped glasses.

In addition to phosphate and tellurite glasses, silicates, borates, borosilicates, and aluminates have also been used as host glass matrix systems for lasing ions. Silicate, borate, borosilicates, and aluminate glasses have broader emission bandwidth for Nd lasing ions in comparison to phosphate glasses.

However, there are disadvantages associated with the use of these glasses. For example, silicate glasses normally melt at very high temperatures, unless they contain significant amount of modifiers, such as alkali metals or alkaline earths metals. Borate glasses, on the other hand, have low temperature melting characteristics, but they require substantially high concentrations of alkali metals or alkaline earth metals to be stable in ambient environments. Borosilicate glasses can be durable at ambient temperatures and are melted at temperatures comparable to standard commercial glasses, such as the soda-lime glass. However, typical commercial borosilicate glasses contain significant amounts of alkali metals, which promote high borate volatility, similar to phosphate glass, during melting. Aluminate glasses exhibit particularly broad emission bandwidths and are attractive for short pulse laser operation. But, these glasses have a very high tendency towards crystallization.

One general trend in solid state lasers is to make high energy lasers with shorter pulse lengths, which drives the power in the pulse to very high numbers. For example, a 10 k Joule laser with a 10 nsec pulse length is a power of 1 TW (1 TW=10000 J/10 nsec). The trend towards the use of high energy lasers with shorter pulse lengths is described in "Terrawatt to pettawatt subpicosecond lasers", M. D. Perry and G. Mourou, Science, Vol 264, 917-924 (1994).

For mode-locked lasers, it is a well-known result, from Fourier's theorem, that the narrower the pulse width, the larger the gain bandwidth required to generate that pulse; thus said to be transform limited. For an inhomogeneously broadened line width of a laser medium, if the intensity of pulses follows a Gaussian function, then the resulting mode-locked pulse will have a Gaussian shape with the emission bandwidth/pulse duration relationship of: Bandwidth X Pulse Duration≥0.44. See W. Koechner, Solid State Laser Engineering, bed, Springer Science, 2006 (pg 540). Clearly, to achieve ever shorter pulse durations it is a requirement to identify glasses with a broad emission bandwidth.

Thus, an important factor in designing laser systems that utilize short pulses is to find gain materials with broad emission bandwidths for the laser transition. The relationship between emission bandwidth and pulse length is: Bandwidth X Pulse Duration ≥0.44. Clearly, the need for ever shorter pulse durations necessitates glasses with a broad emission bandwidth.

Unfortunately, the emission bandwidths achievable in glass hosts are typically many factors smaller than what is possible in the Ti:Sapphire crystal. For high peak power lasers using ultra-short pulses (<100 femto-second pulses or shorter), the emission bandwidth offered by known phosphate laser glass is too narrow compared to that required. In order to overcome this limitation, so-called "mixed" laser glass amplifier approach is used in order to achieve the total bandwidth necessary before the pulse compression. The petawatt laser architecture that is in operation and producing the highest peak powers available today uses this methodology. The design of this petawatt laser is shown in, E. Gaul, M. Martinez, J. Blakeney, A. Jochmann, M. Ringuette, D. Hammond, T. Borger, R. Escamilla, S. Douglas, W. Henderson, G. Dyer, A. Erlandson, R. Cross, J. Caird, C. Ebbers, and T. Ditmire, "Demonstration of a 1.1 petawatt laser based on a hybrid optical parametric chirped pulse amplification/mixed Nd:glass amplifier," Appl. Opt. 49, 1676-1681 (2010).

In these mixed laser glass designs, phosphate and silicate glasses are used in series to achieve the total bandwidth required. See, for example, G. R. Hays, et al., "Broad-spectrum neodymium-doped laser glasses for high-energy chirped-pulse amplification," Appl. Opt. 46[21] (2007) 4813-4819, which describes a mixed-glass architecture using an Nd-doped tantalum/silicate glass and an Nd-doped aluminate glass.

Though proven, this technology is still insufficient for the future compact petawatt and for the future exawatt systems capable of producing high energies at shorter pulse durations. New glasses with bandwidths that are two and three times larger than what is currently available from laser glasses is needed, if there is to be an alternative to Ti:Sapphire for the laser community.

Thus, one aspect of the invention is to provide a solid glass laser medium having a broader emission bandwidth of rare earth ions used as lasing ions.

According to a further aspect of the invention, there is provided a doped phosphate glass composition for use as a solid laser medium having a broad emission bandwidth of rare earth ions used as lasing ions. In particular, there is provided a phosphate laser glass composition containing $Nd_2O_3$ and $Yb_2O_3$ as co-dopants.

Upon further study of the specification and appended claims, further aspects and advantages of this invention will become apparent to those skilled in the art.

While the prior attempts at broadening the emission bandwidths in glasses have focused on modifying the glass host structure, the present invention focuses on the rare-earth dopants, particularly, the energy transfer mechanisms between dopants and the impact of such interactions on laser emission bandwidth. In accordance with the invention, a phosphate glass host is doped with multiple rare-earth dopants, typically $Nd_2O_3$ in combination with $Yb_2O_3$. The resulting emission bandwidths obtained are much broader than what is currently achievable with a single dopant in glass.

The combination of $Nd_2O_3$ and $Yb_2O_3$ has been utilized in other laser glass compositions. De Sousa et. al., "Spectroscopy of $Nd^{3+}$ and $Yb^{3+}$ codoped Fluoroindogallate glasses, J. Appl. Phys., Vol. 90, No. 7, 2001, discloses the result of a study on Nd—Nd and Nd—Yb transfer processes in certain lead fluoroindogallate glasses. The glass compositions were $30PbF_2$-$20GaF_3$-$15InF_3$-$15ZnF_2$-$(20-X)CaF_2$—$XNdF_3$ (with X=0.1, 0.5, 1, 2, 4, and 5); $30PbF_2$-$20GaF_3$-$15InF_3$-$15ZnF_2$-$(20-X)CaF_2$—$XYbF_3$ (with X=0.1, 0.5, 1, 2, 3, and 5); and $30PbF_2$-$20GaF_3$-$15InF_3$-$15ZnF_2$-$(19-X)CaF_2$—$XYbF_3$-$1NdF_3$ (with X=0.1, 0.5, 1, 2, 3, and 5.5).

Rivera-Lòpez et al., "Efficient $Nd^{3+} \to Yb^{3+}$ Energy Transfer Processes in High Photon Energy Phosphate Glasses for 1.0 μm $Yb^{3+}$ Laser," J. Appl. Phys. 109, 123514 (2011) disclose a study on $Nd^{3+} \to Yb^{3+}$ energy transfer in certain phosphate glasses. The glasses studied have the following compositions: 58.5 mol % $P_2O_5$, 17 mol % $K_2O$, 14.5 mol % BaO, 9 mol % $Al_2O_3$, and 1 mol % $Nd_2O_3$; 58.0 mol % $P_2O_5$, 17 mol % $K_2O$, 14.0 mol % BaO, 9 mol % $Al_2O_3$, 1 mol % $Nd_2O_3$, and 1.0 mol % $Yb_2O_3$; 57.5 mol % $P_2O_5$, 17 mol % $K_2O$, 13.5 mol % BaO, 9 mol % $Al_2O_3$, 1 mol % $Nd_2O_3$, and 2.0 mol % $Yb_2O_3$; and 56.5 mol % $P_2O_5$, 17 mol % $K_2O$, 12.5 mol % BaO, 9 mol % $Al_2O_3$, 1 mol % $Nd_2O_3$, and 4.0 mol % $Yb_2O_3$.

Sontakke et al., "Efficient Non-Resonant Energy Transfer in $Nd^{3+}$—$Yb^{3+}$ Codoped Ba—Al metaphosphate Glasses," J. Opt. Soc. Am. B/Vol. 27, No. 12, 2010, disclose a study on the $Nd^{3+} \to Yb^{3+}$ energy transfer in certain alkali-free barium-alumino-metaphosphate glasses. The glass compositions were (99-x) [20.95 mol % BaO, 11.72 mol % $Al_2O_3$, 56.12 mol % $P_2O_5$, 6.79 mol % $SiO_2$, 3.91$B_2O_3$, 0.51 mol % $Nb_2O_5$]+1.0 mol % $Nd_2O_3$+X mol % $Yb_2O_3$ (X=0, 0.05, 0.1, 0.5, 1.0, 3.0, 6.0, 9.0).

See also E. Yahel et al., "Modeling and Optimization of High-Power $Nd^{3+}$—$Yb^{3+}$ Codoped Fiber Lasers," J. Lightwave Technology, Vol. 24, No. 3, pp. 1601-1609 (March 2006).

Laser glass compositions containing combinations of $Nd_2O_3$ and $Yb_2O_3$ are also described in Miura et al. (U.S. Pat. No. 4,806,138), Myers (U.S. Pat. No. 4,962,067), and Myers (U.S. Pat. No. 7,531,473).

The glasses disclosed herein are suitable for use at powers of more than 1000× to 1000000× higher (pettawatt to exawatt levels, or even higher). The disclosed glasses can be used to achieve pulse lengths less than 100 fsec and they will have sufficient high gain to get output energies of >100 kJ. In laser systems, the glasses according to the invention can be energized by the use of a flashlamp as a pump source. Laser diode pumping is also possible.

In accordance with an aspect of the invention, the phosphate glass composition comprises (based on mol %):

| | |
|---|---|
| $P_2O_5$ | 50.00-70.00 |
| $B_2O_3$ | 2.00-10.00 |

-continued

| | |
|---|---|
| $Al_2O_3$ | 1.00-5.00 |
| $SiO_2$ | 1.00-5.00 |
| $Nd_2O_3$ | 0.10-5.00 |
| $Yb_2O_3$ | 0.10-35.00 |
| $La_2O_3$ | 0.00-20.00 |
| $Er_2O_3$ | 0.00-5.00 |
| $CeO_2$ | 0.00-20.00 | wherein the ratio of $Yb_2O_3$ to $Nd_2O_3$ is 1-25 or 0.100-0.333.

In accordance with a further aspect of the invention, the phosphate glass composition is intended for use in a laser that operates Yb wavelengths near 1 μm (1000 nm-1025 nm). In this case, the glass contains 0.10 to 5.0 mol % $Nd_2O_3$ and the $Yb_2O_3$ to $Nd_2O_3$ ratio is 25-1.

In accordance with a further aspect of the invention, the phosphate glass composition is intended for use in a laser that operates at Nd wavelengths (e.g., 1054 nm). In this case, the glass contains 0.10 to 5.0 mol % $Nd_2O_3$ and the $Yb_2O_3$ to $Nd_2O_3$ ratio is 0.100-0.333.

In accordance with a further aspect of the invention, the phosphate glass composition comprises (based on mol %):

| | |
|---|---|
| $P_2O_5$ | 60-70 |
| $B_2O_3$ | 7-10 |
| $Al_2O_3$ | 3-5 |
| $SiO_2$ | 3-5 |
| $Nd_2O_3$ | 0.5-4.0 |
| $Yb_2O_3$ | 0.1-25.0 |
| $La_2O_3$ | 0.0-15 |
| $Er_2O_3$ | 0.00-5.00 |
| $CeO_2$ | 0.0-15 |
| $Cr_2O_3$ | 0.0-1.00 |
| $Nb_2O_5$ | 0.0-1.00 |
| $As_2O_3$ and/or $Sb_2O_3$ | 0.1-1.00 |

In the above embodiment, $As_2O_3$ and $Sb_2O_3$ are used as refining agents and/or antisolarants. Thus, the total amount of these refining agents/antisolarants is 0.1-1.0 mol %.

For lasers pumped by flashlamps, $CeO_2$ and $Nb_2O_5$ act as antisolarants.

In the above embodiment, the function of $Cr_2O_3$ may differ depending on the overall composition of the glass. For example, $Cr_2O_3$ may function as an auxiliary dopant/sensitizer to increase efficiency.

The general glass composition according to the invention may include alkali and/or alkaline earth metals, for example, MO is 0.00-10.00 mol % wherein MO is the sum of MgO, CaO, SrO, BaO, and ZnO; and $M'_2O$ is 0.00-10.00 mol % wherein $M'_2O$ is the sum of $Li_2O$, $Na_2O$, $K_2O$, and $Cs_2O$. But, in accordance with another aspect of the invention the phosphate glass composition does not contain any alkali or alkaline earth metals. In this case, the absence of alkali and alkaline earth metals provides a very low volatility during melting.

Essentially free of alkali metals means that the glass composition according to the invention contains less than 0.5 mol % of alkali metals (such as $Na_2O$, $Li_2O$, and $K_2O$), especially less than 0.1 mol %. Essentially free of alkaline earth metals means that the phosphate glass composition according to the invention contains less than 0.5 mol % of alkaline earth metals (such as BaO, CaO, and MgO), especially less than 0.1 mol %.

With regards to ranges described herein, all ranges include at least the two endpoints of the ranges, as well as all units between the two endpoints. Thus, for example, a range of 1 to 10 is to be understood as expressly disclosing at least the values of 1, 2, 3, 4, 5, 6, 7, 8, 9, and 10.

In the glass composition according to the invention, $P_2O_5$ functions as the source of the primary network former. Thus, according to another aspect of the invention, the phosphate glass composition according to the invention contains 50.00-70.00 mol % of $P_2O_5$, such as 60.00-70.00 mol % of $P_2O_5$, for example, 60, 61, 62, 63, 64, 65, 66, 67 68, 69, or 70 mol % (e.g., 60.00-67.00 mol % of $P_2O_5$).

In the glass composition according to the invention, $B_2O_3$ also acts as a network former. According to another aspect of the invention, the phosphate glass composition according to the invention contains 2.00-10.00 mol % of $B_2O_3$, such as 2, 3, 4, 5, 6, 7, 8, 9, or 10 mol %. For example, the phosphate glass composition according to the invention may contain 3.00-8.00 mol % of $B_2O_3$ or 3.00-5.00 mol % of $B_2O_3$, or 6.00-8.00 mol % of $B_2O_3$, or 7.00-10.00 mol % of $B_2O_3$.

$Al_2O_3$ can also acts as a network former in the glass composition of the invention. According to another aspect, the phosphate glass composition according to the invention contains 1.00-5.00 mol % of $Al_2O_3$, such 1, 2, 3, 4, or 5 mol %. For example, the phosphate glass composition according to the invention may contain 1.00-4.00 mol % of $Al_2O_3$ or 1.00-3.00 mol % of $Al_2O_3$, or 3.00-5.00 mol % of $Al_2O_3$.

$SiO_2$ can also acts as a network former in the glass composition of the invention. According to another aspect, the phosphate glass composition according to the invention contains 1.00-5.00 mol % of $SiO_2$, such 1, 2, 3, 4, or 5 mol %. For example, the phosphate glass composition according to the invention may contain 1.00-4.00 mol % of $SiO_2$ or 1.00-3.00 mol % of $SiO_2$, or 3.00-5.00 mol % of $SiO_2$.

$Nd_2O_3$ and $Yb_2O$ acts as co-dopants and thus both provide the lasing action of the glass. According to another aspect, the phosphate glass composition according to the invention contains 0.10-5.00 mol % of $Nd_2O_3$, such as 0.2, 0.3, 0.4, 0.5, 0.75, 0.85, 1.0, 1.25, 1.5, 1.75, 2.0, 2.5, 3.0, 3.5, 4.0, 4.5, or 5.0 mol %. For example, the phosphate glass composition according to the invention may contain 1.00-4.00 mol % of $Nd_2O_3$ or 1.50-2.50 mol % of $Nd_2O_3$.

According to another aspect, the phosphate glass composition according to the invention contains 0.10-40.00 mol % of $Yb_2O_3$, such as 0.2, 0.3, 0.4, 0.5, 0.75, 0.85, 1.0, 1.25, 1.5, 1.75, 2.0, 2.5, 3.0, 3.5, 4.0, 4.5, 5.0, 10.0, 15.0, 20.0, 25.0, 30.0, 35.0, or 40.0 mol %. For example, the phosphate glass composition according to the invention may contain 0.10-20.00 mol % of $Yb_2O_3$ or 0.10-10.00 mol % of $Yb_2O_3$ or 0.10-1.00 mol % of $Yb_2O_3$, 0.10-5.00 mol % of $Yb_2O_3$, or 8.00-10.00 mol % of $Yb_2O_3$, or 30.00-40.00 mol % of $Yb_2O_3$.

According to another aspect, the phosphate glass composition according to the invention generally contains 0.00-20.00 mol % of $La_2O_3$, for example, 0.00-16.00 mol % of $La_2O_3$ or 0.00-8.00 mol % of $La_2O_3$ or 7.00-16.00 mol % of $La_2O_3$.

According to another aspect, the sum of the rare earth oxides, $Re_2O_3$, i.e., the sum of $La_2O_3$, $Nd_2O_3$, $Yb_2O_3$, $CeO_2$, and $Er_2O_3$ in the phosphate glass composition according to the invention is preferably 0.2-40 mol %, such as 0.3, 0.4, 0.5, 0.6, 0.75, 1.0, 1.5, 2.0, 2.5, 3.0, 3.5, 4.0, 4.5, 5.0, 6.0, 7.0, 8.0, 9.0, 10.0, 11.0, 12.0, 13.0, 14.0, 15.0, 16.0, 17.0, 18.0, 19.0, 20.0, 25.0, 30.0, 35.0, or 40.0 mol %. For example, the phosphate glass composition according to the invention may contain 1-25 mol %, or 5-20 mol %, or 15-20 mol % of $Re_2O_3$.

According to another aspect, the $Yb_2O_3$ to $Nd_2O_3$ mole ratio in the phosphate glass composition according to the invention is 0.100-0.333 (i.e., Yb:Nd of 1:10 to 1:3), such as 0.10, 0.15, 0.18, 0.2, 0.21, 0.22, 0.23, 0.24, 0.25, 0.26, 0.28, 0.29, 0.30, 0.31, 0.32, or 0.33. For example, the $Yb_2O_3$ to Nd$_2$O$_3$ ratio in the phosphate glass composition according to the invention may be 0.1-0.2, or 0.15-0.25, or 0.2-0.3.

According to another aspect, the Yb$_2$O$_3$ to Nd$_2$O$_3$ mole ratio in the phosphate glass composition according to the invention is 1-25 (i.e., Yb:Nd of 1:1 to 25:1), such as 1.0, 1.5, 2.0, 2.5, 3.0, 3.5, 4.0, 4.5, 5.0, 6.0, 7.0, 8.0, 9.0, 10.0, 11.0, 12.0, 13.0, 14.0, 15.0, 16.0, 17.0, 18.0, 19.0, 20.0, 21.0, 22.0, 23.0, 24.0, or 25.0. For example, the Yb$_2$O$_3$ to Nd$_2$O$_3$ ratio in the phosphate glass composition according to the invention may be 1-20, or 2-15, or 2-10, or 5-10.

As mentioned above, the glass composition according to the invention may include alkali metals, M'$_2$O (sum of Li$_2$O, Na$_2$O, K$_2$O, and Cs$_2$O), in amounts of 0.00-10.00 mol %, for example, 0.0, 1.0, 2.0, 3.0, 4.0, 5.0, 6.0, 7.0, 8.0, 9.0, or 10.0 mol %. The alkali metals can be added to the glass composition to further modify laser and mechanical properties of the glass system. See, for example, J. S. Hayden et al., "Effect of composition on the thermal, mechanical and optical properties of phosphate laser glasses," SPIE Vol. 1277 (1990), 127-139.

Also, as mentioned above, the glass composition according to the invention may include alkaline earth metals, MO (sum of MgO, CaO, SrO, BaO, and ZnO), in amounts of 0.00-10.00 mol %, for example, 0.0, 1.0, 2.0, 3.0, 4.0, 5.0, 6.0, 7.0, 8.0, 9.0, or 10.0 mol %. The alkaline earth metals can be added to the glass composition to further modify laser and mechanical properties of the glass system. See, for example, J. S. Hayden et al., "Effect of composition on the thermal, mechanical and optical properties of phosphate laser glasses," SPIE Vol. 1277 (1990), 127-139.

Overall, the sum of the alkali metals and alkaline earth metals, i.e., the sum of MO and M'$_2$O, is 0.00-20.00 mol %, such as 0.0, 1.0, 2.0, 3.0, 4.0, 5.0, 6.0, 7.0, 8.0, 9.0, 10, 11, 12, 13, 14, 15, 16, 17, 18, 19, or 20 mol %. For example the total amount of alkali metals and alkaline earth metals (sum of MO and M'$_2$O) in the glass composition can be 0.0-15.0 mol %, or 0.0-10.0 mol %, or 0.0-5.0 mol %, or 0.0-3.0 mol %.

In accordance with another aspect of the invention, the phosphate composition according to the invention possesses an effective emission bandwidth ($\Delta\lambda_{eff}$) of at least 35 nm, preferably at least 45 nm, especially at least 100 nm, and in particular at least 105 nm.

In accordance with another aspect of the invention, there is provided a laser system wherein a Yb laser is pumped with a flash lamp. Because Yb has minimal absorption for flash lamp light, typical lasers that use Yb doped laser glass for the gain material, use diode technology, which is expensive for scaling up. With the glass composition according to the invention, for glasses wherein the Yb:Nd ratio is 1.0 or higher, flash lamp energy can be absorbed by Nd bands and transferred to Yb laser level.

Laser properties can be measured in accordance with the Judd-Ofelt theory, the Fuchtbauer-Ladenburg theory, or the McCumber method. A discussion of the Judd-Ofelt theory and the Fuchtbauer-Ladenburg theory can be found in E. Desurvire, *Erbium Doped Fiber Amplifiers*, John Wiley and Sons (1994). The McCumber method is as discussed in, for example, Miniscalco and Quimby, Optics Letters 16(4) pp 258-266 (1991). See also Kassab, Journal of Non-Crystalline Solids 348 (2004) 103-107. The Judd-Ofelt theory and the Fuchtbauer-Ladenburg theory evaluate laser properties from an emission curve, whereas the McCumber method uses the absorption curve of the glass. Regarding emission bandwidth, if one has a measured emission curve (such as collected in a Judd-Ofelt or Fuchtbauer-Ladenburg analysis) or a calculated emission curve (from a McCumber analysis) one can get emission bandwidth in two ways. The first way is to simply measure the width at half of the maximum value (called emission bandwidth full width half maximum or $\Delta\lambda_{FWHM}$).

An emission curve for Yb will exhibit a narrow feature at ~980 nm. If this feature is prominent, the $\Delta\lambda_{FWHM}$ value will only reflect the width of this one feature and the rest of the curve will not contribute. As a result the $\Delta\lambda_{FWHM}$ value is not always a reliable indicator of the emission bandwidth for Yb.

The second method divides every point on the emission curve by the total area under the curve. The result, called a linewidth function, will have a peak value that is defined as the inverse of the effective bandwidth, $\Delta\lambda_{eff}$. By this method the entire emission curve always contributed to the emission bandwidth result. It is this value used herein in the analysis as the best indicator of emission bandwidth.

BRIEF DESCRIPTION OF THE DRAWINGS

The invention and further details, such as features and attendant advantages, of the invention are explained in more detail below on the basis of the exemplary embodiments which are diagrammatically depicted in the drawings, and wherein:

FIG. 1 graphically illustrates the experimental emission spectra obtained at different pump energy settings for a Ce—Yb—Nd co-doped glass system;

FIG. 2 graphically illustrates experimental emission spectra obtained at different pump energy settings for the La—Yb—Nd co-doped glass system;

FIG. 3 graphically illustrates emission bandwidth changes as a function of dopant concentrations; and FIG. 4 illustrates a comparison of emission curves of the ultra-broad bandwidth laser glasses according to the invention which contain rare earth mixture with the prior art commercial phosphate glass, LG770.

EXAMPLES

Table 1 lists compositions in accordance with the invention. In addition, Table 4 lists comparison example glass composition wherein the glasses do not contain a Nd—Yb co-doped system. Table 2 lists physical and optical properties of the glasses of Table 1. Table 3 lists the Emission Bandwidth for the glasses of Table 1. Table 5 lists physical and optical properties of the glasses of Table 4. Table 6 lists the Emission Bandwidth for the glasses of Table 4.

All of the glasses were made using laser grade ingredients and melted under a dry oxygen environment with the help of stirring using a platinum stirrer for better homogeneity. All of the glasses were cast into a mold and this was appropriately annealed in order to remove the stress as the liquid cools to the amorphous state. The resulting glass slab was shaped into forms required for use with the instruments that provide various properties for glasses.

The results of these property measurements and calculations are detailed in Table 2 for the glasses included in this invention and in Table 5 for a comparison example.

The fluorescence emission spectrum was obtained by exciting the dopant ions with an Argon laser where the pump wavelength is set at 514 nm. The resulting emission spectrum was collected using a 0.3 m imaging triple grating spectrometer and a 3 mm InGaAs near infrared detector. Step-scans at 0.1 nm intervals were obtained with a 600 grooves/m grating in the spectrometer. A sample of each glass was used to measure the emission spectrum, from which the effective emission bandwidth ($\Delta\lambda_{eff}$) was determined according to Equation (1):

$$\Delta\lambda_{eff} = \frac{\int_{800}^{1200} I(\lambda)d\lambda}{I_{max}}. \qquad (1)$$

The integrated area of the spectrum was made between 800 and 1200 nm. Each curve that was collected is post-processed using a FFT smoothing filter of appropriate length. The smoothed spectra were used for calculations in order to reduce the noise level in the data sets. See for example FIG. 1 and FIG. 2 which show the data after smoothing.

In FIG. 1 and FIG. 2 are emission curves for two examples, CYN-1 and LYN-4. In each case three emission peaks are noted in the emission spectra. The peaks at nominally 980 nm and 1000 nm are assigned to $Yb_2O_3$ and the peak at nominally 1060 nm is assigned to $Nd_2O_3$. It should be noted that ytterbium has self-absorption in the region near 980 nm, so not all of the emission in the example glasses can be effectively utilized in an actual laser system.

In FIG. 1, nearly 110 nm of bandwidth is calculated from the measured spectra for the Ce—Yb—Nd co-doped glass. In FIG. 2, nearly 105 nm of bandwidth is calculated for the La—Yb—Nd co-doped glass.

tion which contain rare earth mixture with the prior art phosphate glass, LG770, which contains $P_2O_5$, $Al_2O_3$, $K_2O$, MgO, and $Nd_2O_3$ (See U.S. Pat. No. 5,526,639). As can be seen, the glass composition of the invention, CYN-1, has a significantly broader bandwidth than that of LG770.

TABLE 1

Glass Compositions (mol %) of New Ultra-broad Bandwidth Laser Glasses Containing Rare Earth Mixtures

| Mol % | Example | | | | | |
|---|---|---|---|---|---|---|
| Oxide | YN-1 | LYN-1 | LYN-2 | LYN-3 | LYN-4 | CYN-1 |
| $SiO_2$ | 1.364 | 4.001 | 4.001 | 4.001 | 4.001 | 4.001 |
| $B_2O_3$ | 3.158 | 7.992 | 7.992 | 7.992 | 7.992 | 7.992 |
| $Al_2O_3$ | 2.315 | 4.001 | 4.001 | 4.001 | 4.001 | 4.001 |
| $P_2O_5$ | 53.133 | 65.955 | 65.955 | 65.955 | 65.955 | 65.955 |
| $CeO_2$ | | | | | | 15.352 |
| $Nd_2O_3$ | 2.005 | 2.100 | 1.965 | 1.900 | 1.950 | 1.673 |
| $Yb_2O_3$ | 38.025 | 7.975 | 0.850 | 0.200 | 0.420 | 0.358 |
| $La_2O_3$ | | 7.975 | 15.235 | 15.235 | 15.235 | |
| $Nd_2O_3/Yb_2O_3$ | 0.053 | 0.263 | 2.312 | 9.500 | 4.643 | 4.673 |
| $Yb_2O_3/Nd_2O_3$ | 18.965 | 3.798 | 0.433 | 0.105 | 0.215 | 0.214 |

TABLE 2

Properties of New Ultra-broad Bandwidth Laser Glasses Containing Rare Earth Mixtures

| | Example | | | | | |
|---|---|---|---|---|---|---|
| Property | YN-1 | LYN-1 | LYN-2 | LYN-3 | LYN-4 | CYN-1 |
| Refractive Index, nd | 1.54794 | 1.56212 | 1.58040 | 1.58438 | 1.58312 | 1.56140 |
| Abbe Number, Vd | 62.77 | 62.62 | 61.57 | 61.39 | 61.21 | 59.20 |
| Refractive Index at 1054 nm, $n_{1054}$ | 1.539 | 1.553 | 1.571 | | | |
| Nonlinear Index, $n_2$ [esu] | 1.31 | 1.37 | 3.96 | | | |
| Absorption at 3000 nm [$cm^{-1}$] | 0.190 | 1.11 | 0.56 | 0.60 | | |
| Absorption at 3333 nm [$cm^{-1}$] | 0.589 | 1.48 | 0.98 | 1.04 | | |
| Density [$gm/cm^3$] | 3.403 | 3.260 | 3.207 | 3.204 | 3.200 | 2.997 |
| Thermal Expansion from 20-300° C. [ppm/K] | 4.79 | 5.82 | 6.61 | | | |
| Transformation Point, Tg(DTA) [° C.] | 769.3 | 706.3 | NA | | | |
| Transformation Point, Tg (Dilatometer) [° C.] | NA | NA | 651.0 | | | |
| Thermal Conductivity at 25° C., $K_{25°C.}$ [W/mK] | 0.5106 | 0.51 | 0.57 | | | |
| Thermal Conductivity at 90° C., $K_{90°C.}$ [W/mK] | 0.629 | 0.63 | 0.61 | | | |
| Poisson's Ratio | 0.23 | 0.24 | 0.25 | | | |
| Young's Modulus, E [GPa] | 66.40 | 64.0 | 64.2 | | | |
| Fracture Toughness, $K_{1C}$ [$MPa/m^{1.5}$] | 0.825 | 0.78 | 0.86 | | | |
| Hardness, HK | 412.4 | 380 | 410 | | | |

In Table 3 it is shown that LYN-2 glass with a $Nd_2O_3/Yb_2O_3$ ratio of ~2.3 produces the smallest effective emission bandwidth compared to the other example glasses with the $Nd_2O_3/Yb_2O_3$ that is higher or lower than LYN-2.

FIG. 3 illustrates how the emission spectrum, and consequently the effective emission bandwidth, can be tuned and extended with the optimal selection of doping levels of both $Nd_2O_3$ and $Yb_2O_3$. The key to maximizing the emission bandwidth is to adjust the doping concentrations so that the three emission peaks are produced at nominally the same intensity. As can be seen from the Figure, selection of the optimal doping ratio between $Nd_2O_3$ and $Yb_2O_3$ can increase the emission bandwidth from about 45 nm to over 100 nm FIG. 4 illustrates a comparison of emission curves of the ultra-broad bandwidth laser glasses according to the inven-

TABLE 3

Emission Bandwidth of New Ultra-broad Bandwidth Laser Glasses Containing Rare Earth Mixtures

| | Example | | | | | |
|---|---|---|---|---|---|---|
| Property | YN-1 | LYN-1 | LYN-2 | LYN-3 | LYN-4 | CYN-1 |
| $Nd_2O_3/Yb_2O_3$ Ratio | 0.053 | 0.263 | 2.312 | 9.500 | 4.643 | 4.673 |
| $Yb_2O_3/Nd_2O_3$ Ratio | 18.965 | 3.798 | 0.433 | 0.105 | 0.215 | 0.214 |
| Emission Bandwidth [nm] | 129.7 | 90.3 | 45.7 | 83.3 | 105.1 | 108.8 |

TABLE 4

Glass Compositions (mol %) of Prior Art Glasses without Incorporation of Multiple Rare Earth Mixtures

| | Example | |
|---|---|---|
| Mol % Oxide | Y-1 | N-1 |
| $SiO_2$ | 4.001 | 4.001 |
| $B_2O_3$ | 7.992 | 7.992 |
| $Al_2O_3$ | 4.001 | 4.001 |
| $P_2O_5$ | 65.955 | 65.955 |
| $CeO_2$ | | |
| $Nd_2O_3$ | | 1.000 |
| $Yb_2O_3$ | 18.051 | |
| $La_2O_3$ | | 17.051 |

TABLE 5

Properties of Prior At Glasses without Incorporation of Multiple Rare Earth Mixtures

| | Example | |
|---|---|---|
| Property | Y-1 | N-1 |
| Refractive Index, nd | 1.55087 | 1.58720 |
| Abbe Number, Vd | 62.76 | 61.26 |
| Refractive Index at 1054 nm, $n_{1054}$ | 1.542 | 1.577 |
| Nonlinear Index, $n_2$ [esu] | 1.32 | 1.52 |
| Absorption at 3000 nm [$cm^{-1}$] | 0.744 | 0.53 |
| Absorption at 3333 nm [$cm^{-1}$] | 1.273 | 0.95 |
| Density [$gm/cm^3$] | 3.470 | 3.232 |
| Thermal Expansion from 20-300° C. [ppm/K] | 47.7 | 68.7 |
| Transformation Point, Tg (DTA) [° C.] | 758.7 | NA |
| Transformation Point, Tg (Dilatometer) [° C.] | too high | 650.0 |
| Thermal Conductivity at 25° C., $K_{25° C.}$ [W/mK] | 0.5107 | 0.52 |
| Thermal Conductivity at 90° C., $K_{90° C.}$ [W/mK] | 0.6253 | 0.66 |
| Poisson's Ratio | 0.23 | 0.27 |
| Young's Modulus, E [GPa] | 67.73 | 64.1 |
| Fracture Toughness, $K_{1C}$ [$MPa/m^{1.5}$] | 0.825 | 0.78 |
| Hardness, HK | 408.9 | 420 |

TABLE 6

Emission Bandwidth of Prior Art Glasses without Incorporation of Multiple Rare Earth Mixtures

| | Example | |
|---|---|---|
| Property | Y-1 | N-1 |
| Emission Bandwidth [nm] | 76.4 | 33.45 |

The entire disclosure[s] of all applications, patents and publications, cited herein, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An Nd-doped and Yb-doped phosphate glass composition comprising (based on mol %):

| | |
|---|---|
| $P_2O_5$ | 50.00-70.00 |
| $B_2O_3$ | 2.00-10.00 |
| $Al_2O_3$ | 1.00-5.00 |
| $SiO_2$ | 1.00-5.00 |
| $Nd_2O_3$ | 0.10-5.00 |
| $Yb_2O_3$ | 0.10-35.00 |
| $La_2O_3$ | 0.00-20.00 |
| $Er_2O_3$ | 0.00-5.00 |
| $CeO_2$ | 0.00-20.00 | wherein the mole ratio of $Yb_2O_3$ to $Nd_2O_3$ is 1-25 or 0.100-0.333.

2. An Nd-doped and Yb-doped phosphate glass composition according to claim 1, wherein the $Yb_2O_3$ to $Nd_2O_3$ mole ratio is 1-25.

3. An Nd-doped and Yb-doped phosphate glass composition according to claim 2, wherein the $Yb_2O_3$ to $Nd_2O_3$ mole ratio is 1-20.

4. An Nd-doped and Yb-doped phosphate glass composition according to claim 1, wherein the $Yb_2O_3$ to $Nd_2O_3$ ratio is 0.100-0.333.

5. An Nd-doped and Yb-doped phosphate glass composition according to claim 4, wherein the $Yb_2O_3$ to $Nd_2O_3$ mole ratio is or 0.2-0.3.

6. An Nd-doped and Yb-doped phosphate glass composition according to claim 1, wherein said glass composition contains 0.00-10.00 mol % MO and 0.00-10.00 mol % $M'_2O$, wherein MO is the sum of MgO, CaO, SrO, BaO, and ZnO, and $M'_2O$ is the sum of $Li_2O$, $Na_2O$, $K_2O$, and $Cs_2O$.

7. An Nd-doped and Yb-doped phosphate glass composition according to claim 1, wherein said glass composition contains less than 0.5 mol % of alkali metals.

8. An Nd-doped and Yb-doped phosphate glass composition according to claim 1, wherein said glass composition contains less than 0.5 mol % of alkaline earth metals.

9. An Nd-doped and Yb-doped phosphate glass composition according to claim 1, wherein said glass composition contains 60.00-70.00 mol % of $P_2O_5$.

10. An Nd-doped and Yb-doped phosphate glass composition according to claim 1, wherein said glass composition contains 3.00-8.00 mol % of $B_2O_3$.

11. An Nd-doped and Yb-doped phosphate glass composition according to claim 1, wherein said glass composition contains 1.00-4.00 mol % of $Al_2O_3$.

12. An Nd-doped and Yb-doped phosphate glass composition according to claim 1, wherein said glass composition contains 1.00-4.00 mol % of $SiO_2$.

13. An Nd-doped and Yb-doped phosphate glass composition according to claim 1, wherein said glass composition contains 1.00-4.00 mol % of $Nd_2O_3$.

14. An Nd-doped and Yb-doped phosphate glass composition according to claim 1, wherein said glass composition contains 0.10-20.00 mol % of $Yb_2O_3$.

15. An Nd-doped and Yb-doped phosphate glass composition according to claim 1, wherein said glass composition contains 0.00-16.00 mol % of $La_2O_3$.

16. An Nd-doped and Yb-doped phosphate glass composition according to claim 1, wherein the sum of $La_2O_3$, $Nd_2O_3$, $Yb_2O_3$, $CeO_2$, and $Er_2O_3$ in the phosphate glass composition is 1-25 mol %.

17. An Nd-doped and Yb-doped phosphate glass composition according to claim 1, wherein the sum of MO and $M'_2O$, is 0.00-15.00 mol %.

18. An Nd-doped and Yb-doped phosphate glass composition according to claim 1, wherein the phosphate composition has an effective emission bandwidth ($\Delta\lambda_{eff}$) of at least 35 nm.

19. An Nd-doped and Yb-doped phosphate glass composition according to claim 1, wherein said glass composition comprises (based on mol %):

| | |
|---|---|
| $P_2O_5$ | 60-70 |
| $B_2O_3$ | 7-10 |
| $Al_2O_3$ | 3-5 |
| $SiO_2$ | 3-5 |
| $Nd_2O_3$ | 0.5-4.0 |
| $Yb_2O_3$ | 0.1-25.0 |
| $La_2O_3$ | 0.0-15 |
| $Er_2O_3$ | 0.00-5.00 |
| $CeO_2$ | 0.0-15 |
| $Cr_2O_3$ | 0.0-1.00 |
| $Nb_2O_5$ | 0.0-1.00 |
| $As_2O_3$ and/or $Sb_2O_3$ | 0.1-1.00. |

20. A solid state Yb laser system comprising a Yb-doped phosphate glass composition according to claim 1, as the solid gain medium and at least one flash lamp as the pumping source, wherein the Yb:Nd ratio of said glass composition is 1.0 or higher.

21. In a solid state laser system comprising a solid gain medium and a pumping source, the improvement wherein said solid gain medium is a glass having a composition according to claim 1.

22. A laser system according to claim 21, wherein the power output of system is at least a pettawatt per pulse or greater.

23. A method for generating a laser beam pulse comprising flash lamp pumping or diode pumping a glass composition according to claim 1.

24. A method for generating a laser beam pulse comprising flash lamp pumping a laser system according to claim 21.

* * * * *